United States Patent
Sateeshchandra

(10) Patent No.: US 6,836,589 B2
(45) Date of Patent: Dec. 28, 2004

(54) LOW LOSS OPTICAL SWITCH USING DUAL AXIS PIEZO ACTUATION AND SENSING

(75) Inventor: Bajikar Sateeshchandra, San Jose, CA (US)

(73) Assignee: Nortel Networks, Ltd., St. Laurent (CA)

( * ) Notice: Subject to any disclaimer, the term of this patent is extended or adjusted under 35 U.S.C. 154(b) by 75 days.

(21) Appl. No.: 10/384,108

(22) Filed: Mar. 7, 2003

(65) Prior Publication Data

US 2004/0013362 A1 Jan. 22, 2004

Related U.S. Application Data

(60) Provisional application No. 60/368,018, filed on Mar. 27, 2002.

(51) Int. Cl.$^7$ .............................. G02B 6/32; G02B 6/35
(52) U.S. Cl. ............................ 385/33; 385/16; 385/52; 385/57
(58) Field of Search ..................... 385/16–18, 33–34, 385/52, 57

(56) References Cited

U.S. PATENT DOCUMENTS

| | | | | |
|---|---|---|---|---|
| 4,204,742 A | * | 5/1980 | Johnson et al. ................ 385/16 |
| 4,303,302 A | * | 12/1981 | Ramsey et al. ............... 385/23 |
| 4,626,066 A | * | 12/1986 | Levinson ...................... 385/33 |
| 6,434,287 B1 | * | 8/2002 | Leyva et al. .................. 385/16 |
| 6,539,132 B2 | * | 3/2003 | Ivtsenkov et al. ............. 385/16 |
| 6,738,539 B2 | * | 5/2004 | Hagood et al. ............... 385/16 |
| 6,763,160 B2 | * | 7/2004 | Laberge et al. ............... 385/17 |
| 6,785,437 B2 | * | 8/2004 | Hagood et al. ............... 385/16 |
| 2003/0128912 A1 | * | 7/2003 | Dames et al. ................ 385/17 |

* cited by examiner

*Primary Examiner*—Brian Healy
*Assistant Examiner*—James P. Hughes
(74) *Attorney, Agent, or Firm*—John C. Gorecki, Esq.

(57) ABSTRACT

Apparatus for producing a collimated light beam within an optical switch, the apparatus comprising: a supporting structure having a first actuator and a second actuator, the first actuator being selectively adjustable along a first plane, and the second actuator being selectively adjustable along a second plane; a fiber optic line having a terminal end to emit a light beam therefrom, the terminal end of the fiber optic line being supported by the first actuator, whereby adjustment of the first actuator repositions the terminal end of the fiber optic line; and a collimator lens being supported by the second actuator, whereby adjustment of the second actuator repositions the collimator lens; wherein at least one of the terminal end of the fiber optic line and collimator lens is repositioned relative to the other one so as to position the light beam emitted by the terminal end of the fiber optic line through a given location of through the collimator lens, which in turn produces the collimated light beam within the optical switch.

38 Claims, 6 Drawing Sheets

LOW LOSS OPTICAL SWITCH USING DUAL AXIS PIEZO ACTUATION AND SENSING

REFERENCE TO PENDING PRIOR PATENT APPLICATION

This patent application claims benefit of now abandoned prior U.S. Provisional Patent Application Ser. No. 60/368,018, filed Mar. 27, 2002 by Sateeshandra Bajikar for LOW LOSS OPTICAL SWITCH USING DUAL AXIS PIEZO AND SENSING, which patent application is hereby incorporated herein by reference.

FIELD OF THE INVENTION

This invention relates to optical switching networks in general, and more particularly to a lens controller and a fiber controller for independently positioning each element relative to one another.

BACKGROUND OF THE INVENTION

Often it is desirable to have a relatively small switching fabric for a variety of purposes, such as optical add-drop or small switching fabrics for all-optical networks. A variety of techniques have been used for this purpose. For example, it is possible to use micromachined moving mirrors for free space optical switching devices. Mirrors inserted between collimators may be used to switch the beam around between the collimators. Likewise, it is possible to move the fiber in front of the collimator lens and thereby steer the beam from one collimator to another. This actuation may be done by using piezoelectric, magnetic or other means. Or, conversely, the collimator lens may be moved in front of a stationary fiber to achieve the same beam deflection, with similar actuation mechanisms if desired.

It is generally very important that such actuation mechanisms not be affected by vibrations that may occur in the environment of the switch. In addition, in order to make the fabric expandable, it is generally important that the elements of the fabric not be affected by vibrations that occur during module insertion, which is used to expand the switching fabric. It is also important that the insertion and proper docking of an expansion module occurs in an environment that requires a minimum amount of environmental protection so as to make the insertion mechanism simple and inexpensive. In this respect it should be appreciated that the ability to expand a modular fabric during operation allows for a low entry cost of the whole array. Therefore, it is generally quite desirable to construct a switching fabric that has very low loss, and has a low cost, and that can be expanded on demand to a relatively large size (e.g., 256× 256).

SUMMARY OF THE INVENTION

By providing two independently controlled piezo actuators, oriented along axes orthogonal to one another and moving in directions orthogonal to each other, it becomes possible to move both the lens and the fiber independently of one another, and in such a way that the beam can be displaced over a large field. Vibration control is thereby vastly improved for vibrations caused by both environmental factors and module insertion. This allows for relatively simple module insertion during operation and, therefore, allows for fully modular assembly during the operation of the switch fabric. The control system is also considerably simplified due to the absence of mechanical or other coupling between the two axes. The use of a bending unimorph, bending bimorph, or another similar actuator further assists with control because such actuation tends to excite only the desired mode and does not tend to excite higher modes. This is a significant feature, since the control and damping of higher modes, once excited, generally requires more elaborate sensing and control mechanisms.

BRIEF DESCRIPTION OF THE DRAWINGS

These and other objects and features of the present invention will be more fully disclosed by the following detailed description of the preferred embodiments of the invention, which is to be considered together with the accompanying drawings wherein like numbers refer to like parts, and further wherein.

DETAILED DESCRIPTION OF THE PREFERRED EMBODIMENTS

Figure 1:
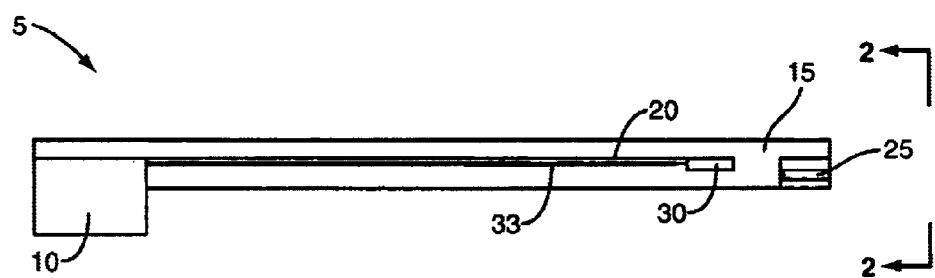
FIG. 1 is a schematic top view of a beam-steering collimator formed in accordance with the present invention.
Figure 2:
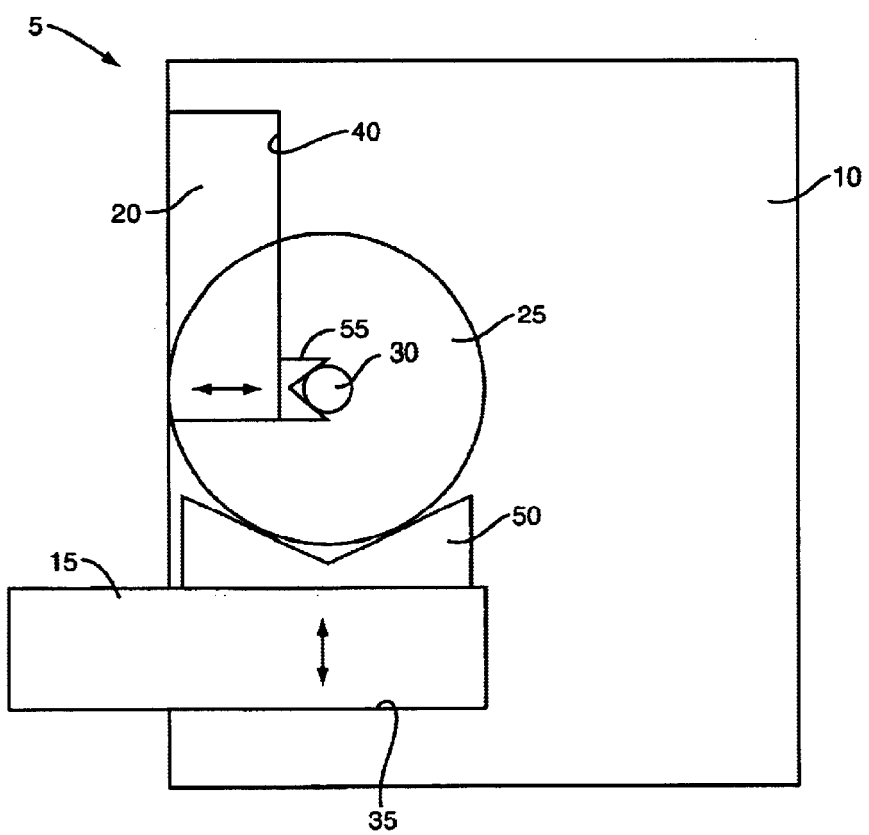
FIG. 2 is a schematic end view of the collimator shown in FIG. 1.

Referring first to FIGS. 1 and 2, there is shown a two dimensional scanning collimator 5. Two dimensional scanning collimator 5 comprises a stationary post 10 supporting two independent piezo actuators 15, 20. Piezo actuators 15, 20 are selectionably positionable so as to move vertically and laterally, respectively. Piezo actuators 15, 20 may include, but are not limited to, bimorph actuators or unimorph actuators. Actuator 15 positionably supports a lens 25 with a vertically positionable orientation, and actuator 20 positionably supports a ferrule 30 with a horizontally positionable orientation. It should be noted that these positions may be reversed if desired, or may be configured at an offset angle. A fiber 33 is shown connected to ferrule 30 so as to "launch" a light beam through lens 25 into free space. Typically, ferrule 30 has an 8 degree end-cut so as to reduce back reflection. The relative transverse positions of lens 25 and ferrule 30 determine the orientation of the light beam (not shown). At a receiving end, the light beam (not shown) is received in a symmetrical arrangement, and redirected toward a receiving fiber (not shown). Preferably, lens 25 is spaced from ferrule 30 at a distance equal to the focal length of the lens plus the Raleigh range of the light beam. Significantly, the present invention uses two independent actuators 15, 20 that are shorter and, hence, much stiffer than other actuators. Actuators 15, 20 are stiff and suppress vibrations in their respective bending directions due to feedback, and are naturally stiff in an orthogonal direction due to their respective geometries.

In one preferred form of the invention, and referring now to FIG. 2, piezo actuators 15, 20 are positioned in, and extend from, precision grooves 35, 40, respectively, formed in post 10. These precision grooves 35, 40 are shown in FIG. 2 as being on the same side of stationary post 10; however, if desired, precision grooves 35, 40 may be positioned on sides opposite to one another. Another groove (not illustrated) may also be provided in stationary post 10 for the fiber 33 (FIG. 1). In one preferred form of the invention, and referring again to FIG. 2, guides 50, 55 are positioned on piezo actuators 15, 20, respectively, so as to support lens 25 and ferrule 30, respectively. During the initial assembly, guides 50, 55 support lens 25 and ferrule 30, respectively, against one another longitudinally so as to allow for kinematic location.

In one embodiment of the present invention, the position of the longitudinal axis of actuator 15 at rest and the position of the longitudinal axis of actuator 20 at rest each extend generally parallel with one another so as to provide orthogonal motion. In another embodiment of the present invention, one or both of the actuators 15, 20 may be tilted with respect to the face of post 10. This construction can be useful where the beams emerging from a plurality of two dimensional scanning collimators 5 converge toward a single point.

Post 10 is constructed from one or more stable materials. Preferably, post 10 comprises an insulating material such as a ceramic, glass or machinable ceramic. This insulation material is preferably disposed on at least the surface of post 10. Post 10 may also be used to carry electrical interconnects as will be described hereinbelow.

Figure 3:
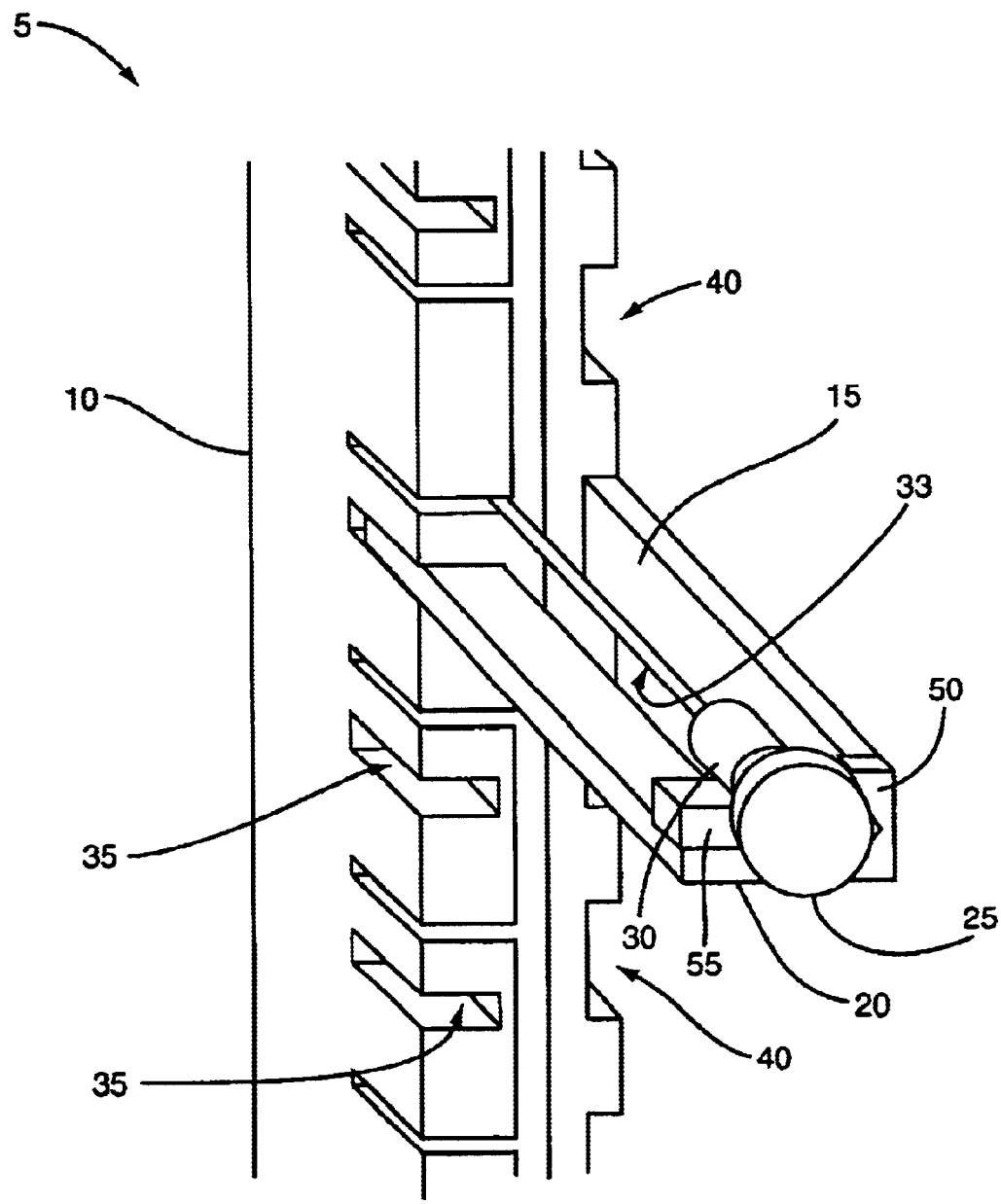
FIG. 3 is a schematic perspective view of a modified form of the collimator shown in FIG. 1.

Referring next to FIG. 3, there is shown a two dimensional scanning collimator 5 having its lens 25 positionably supported by actuator 15 with a horizontally (laterally) positionable orientation, and its ferrule 30 positionably supported by actuator 20 with a vertically positionable orientation. Flat flex cables may be attached to any of the sides of post 10 so as to provide leads for each module, and also to provide contacts for the drivers of bimorph actuators 15, 20 and sensors contained thereon. For best stability, the leads of the bimorphs are not disposed over the contact area with post 10, such that no active deformation occurs in this area. For clarity, there is shown only one set of actuators 15, 20 on post 10. More preferably, each post 10 comprises a plurality of sets of actuators 15, 20.

Figure 4:
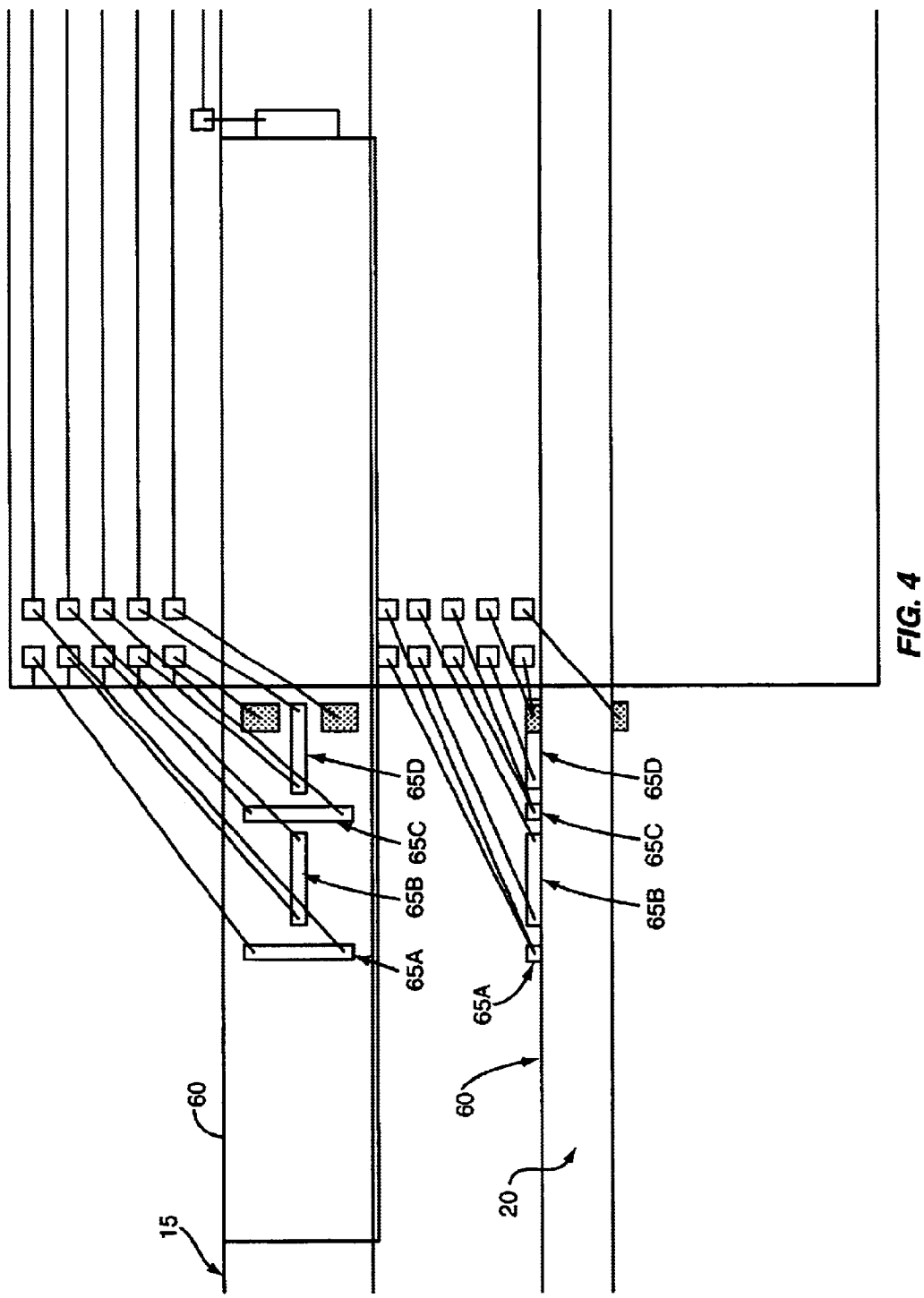
FIG. 4 is schematic diagram of a set of piezo actuators, with piezo resistive sensors attached thereto.

Looking now at FIG. 4, there is shown a pair of piezo deflectors 60 mounted on actuators 15, 20, respectively. Piezo deflectors 60 serve to move actuators 15, 20. Piezo deflectors 60 are charge controlled devices and, when constant voltage is applied, drift occurs over time. To this end, it is preferable to equip each bimorph actuator 15, 20 with a set of bending sensors 65A–65D. The four bending sensors 60A–60D are preferably semiconductor strips attached to the bimorph actuator 15, 20. Alternatively, other sensor gauges may be used instead of semiconductor strips, so as to measure the bending stresses. The output of these sensors 60A–60D may be used to initially position set points for actuators 15, 20, and optical feedback may be used to update these set points.

Figure 5:
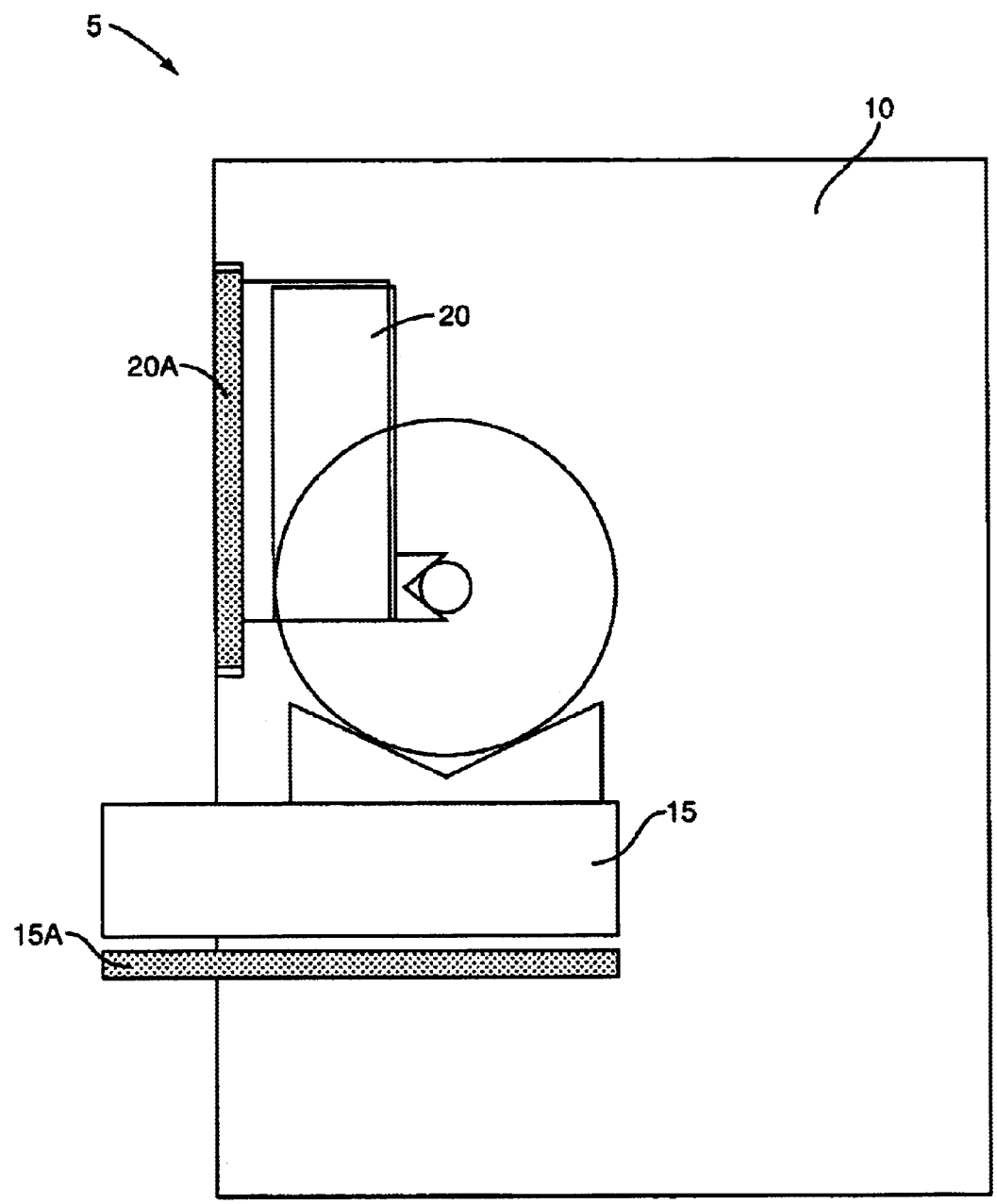
FIG. 5 is a schematic view of another form of the invention, comprising a compact capacitive sensing arrangement for a pair of actuators.

Looking next at FIG. 5, there is shown a two dimensional scanning collimator 5 which is generally similar to the collimator 5 shown in FIGS. 1 and 2, but which also includes plates 15A, 20A for capacitive sensing. Plates 15A, 20A are positioned parallel to actuators 15 and 20, and sense the deflection of the actuators 15, 20 with the application of an AC signal. This is a very simple, compact arrangement. Alternately, capacitive sensing may be accomplished by placing fixed plates relative to lens 25 and fiber 30, respectively.

Other position sensing principles may also be employed in two dimensional scanning collimator 5 for the same purposes, such as a combination of magnet and pick-up coil (not shown), or magnet and Hall effect sensor (not shown), or optical schemes (not shown) involving normal or position sensitive diodes in conjunction with light sources.

Further enhancements to the performance of two dimensional scanning controller 5 may be achieved by segmenting the electrodes (not shown) on actuators 15, 20 so as to allow for an independent application of voltages to each segmented element, along with additional strain/capacitive sensors (not shown). With precise placement of these electrodes (not shown) and sensors (not shown), and with a further servo control loop (not shown) cascading off the principal control loop, improved performance may be obtained in switching speed and vibration stability.

Figure 6A:
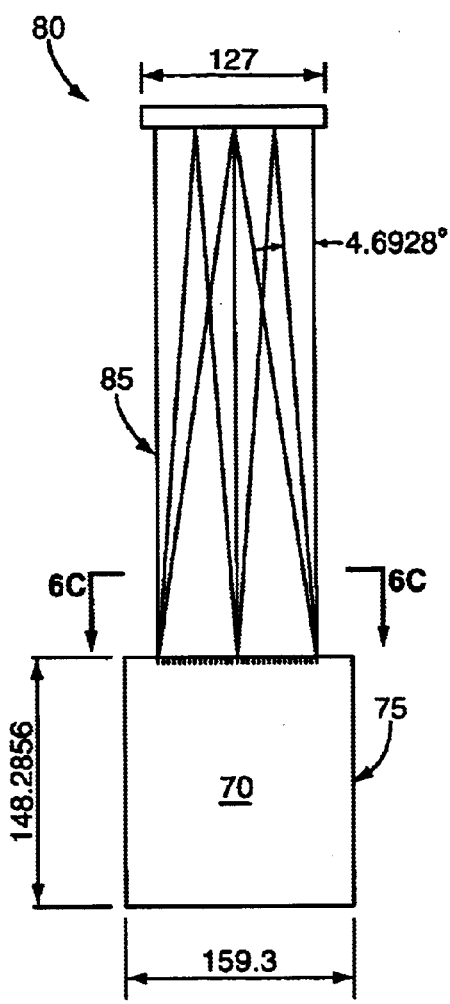
FIGS. 6A–6C are schematic views of another embodiment of the present invention, comprising an arrangement of actuator modules.
Figure 6B:
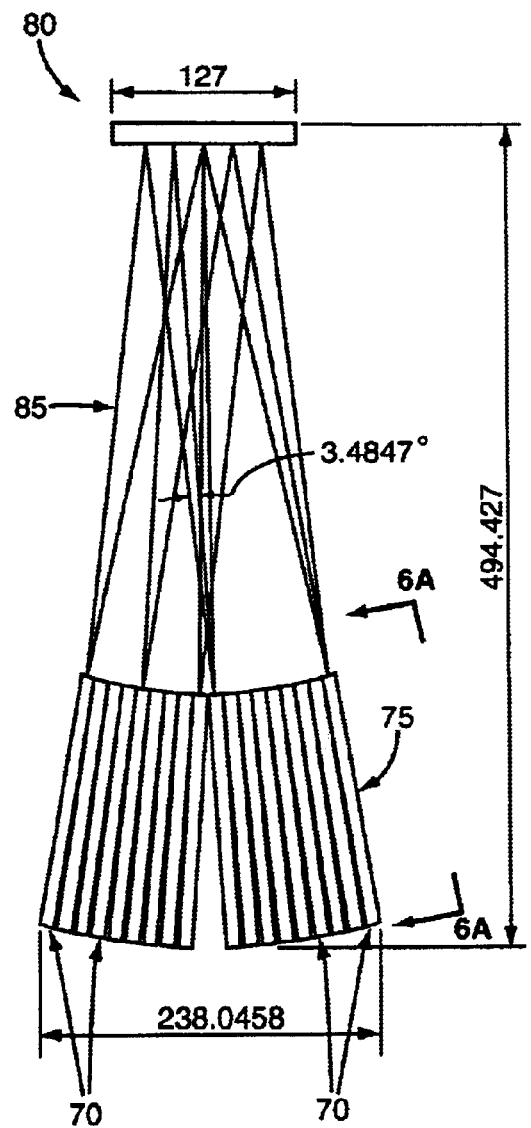
Figure 6C:
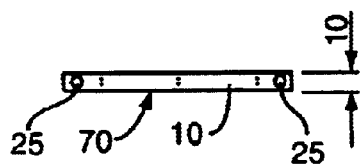

Referring next to FIGS. 6A–6C, there are shown modules 70, each having posts 10, that lend themselves to easy insertion into, and removal from, an assembly 75, without disturbing the switch 80 in its operation. Such modules 70 may be stacked together in an easily expandable fashion, with the collimator beams 85 converging in two directions.

More particularly, and looking first at FIG. 6A, this sideview of one module 70 shows how the various collimator beams 85 in a single module 70 converge toward the center of the field of switch 80. At the same time, and looking now at FIG. 6B, this top view of the entire assembly 75 shows how the tilt angle of the individual modules 70 is such that the collimator beams 85 of those modules 70 disposed on the left side converge on the center of modules 70 disposed on the right side, and vice versa. The angular separations between modules 70 allow contact free insertion.

Figure 7A:
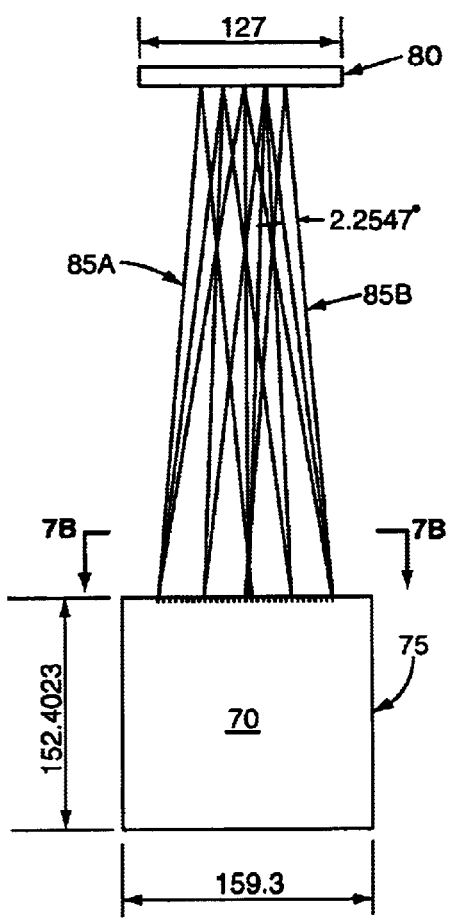
FIGS. 7A–7D are schematic views of another embodiment of the present invention, comprising another arrangement of actuator modules.
Figure 7B:
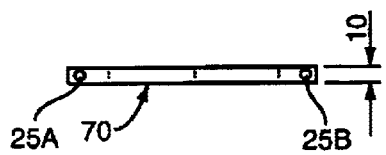
Figure 7C:
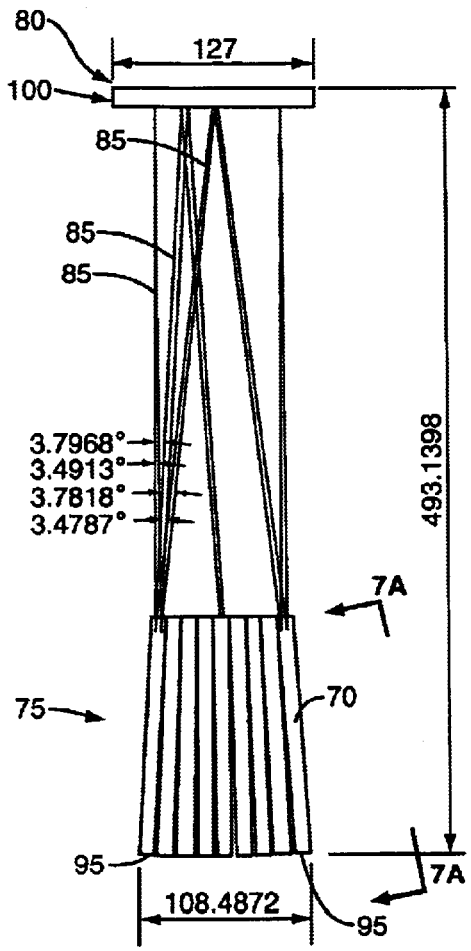
Figure 7D:
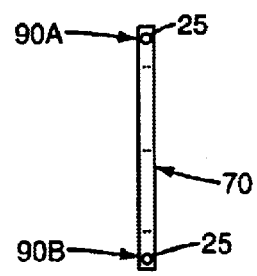

In FIGS. 7A–7D, there is illustrated another, somewhat more complex arrangement. Here, as seen in the sideview of FIG. 7A and the end view of FIG. 7B, each of the modules 70 can have its collimator beams 85 converge vertically. At the same time, and looking now at FIGS. 7C and 7D, (i) each of the collimator beams within a given module 70 may be adjustable horizontally, and (ii) each of the modules 70 may be tilted within the array 75 so that beams 85 converge horizontally. As can be seen, this arrangement combines together sets of parallel elements, saves on space and results in decreased deflection angles.

It is to be understood that the present invention is by no means limited to the particular constructions and method steps disclosed above and/or shown in the drawings, but also comprises any modifications or equivalents within the scope of the claims.

What is claimed is:

1. Apparatus for producing a collimated light beam within an optical switch, said apparatus comprising:

a fiber optic line selectively positionable within said optical switch, said fiber optic line having a terminal end to emit a light beam therefrom;

first adjustment means for adjusting said fiber optic line along a first plane, whereby adjustment of said first adjustment means repositions said terminal end of said fiber optic line;

a collimator lens selectively positionable within said optical switch;

second adjustment means for adjusting said collimator lens along a second plane, whereby adjustment of said second adjustment means repositions said collimator lens;

wherein at least one of said terminal end of said fiber optic line and said collimator lens is repositioned relative to the other one so as to direct said light beam emitted by said terminal end of said fiber optic line to a given location through said collimator lens, which in turn produces said collimated light beam within said optical switch.

2. Apparatus according to claim 1 wherein said given location of said light beam through said collimator lens produces said collimated light beam with an optimum power transmission within said optical switch.

3. Apparatus according to claim 1 wherein said given location through said collimator lens directs said collimated light beam toward a first position within said optical switch.

4. Apparatus according to claim 3 further comprising repositioning means providing control signals to said first adjustment means and said second adjustment means so as to reposition said light beam from said given location to another given location relative to said collimator lens, which in turn repositions said collimated light beam from said first position to a second position within said optical switch.

5. Apparatus according to claim 4 wherein said first position comprises a first reflector and said second position comprises a second reflector.

6. Apparatus according to claim 1 further comprising piezo deflectors mounted to portions of each of said first adjustment means and said second adjustment means, respectively, said piezo deflectors being selectively deformable so as to bend said portions of said first actuator in a parallel direction to said first plane and said second actuator in a parallel direction to said second plane, respectively.

7. Apparatus according to claim 1 wherein each of said first adjustment means and said second adjustment means comprise sensors mounted thereon, wherein each one of said sensors monitors positional drift of a first given portion of said first adjustment means and a second given portion of said second adjustment means for voltage over a period of time.

8. Apparatus according to claim 7 wherein said sensors comprise piezo resistive sensors.

9. Apparatus according to claim 7 wherein said piezo resistive sensors comprise semiconductor strips.

10. Apparatus according to claim 7 wherein said sensors comprise sensor gauges configured to measure bending stresses.

11. Apparatus according to claim 1 further comprising first locator means for locating a first given portion of said first adjustment means relative thereto, and second locator means for locating a second given portion of said second adjustment means relative thereto.

12. Apparatus according to claim 11 wherein said first locator means and said second locator means comprise a first capacitive plate and a second capacitive plate, respectively, said first capacitive plate being disposed adjacent to said first given portion of said first adjustment means so as to determine the position of said first adjustment means relative to said first capacitive plate, and said second capacitive plate being disposed adjacent to said second given portion of said first adjustment means so as to determine the position of said second adjustment means relative to said second capacitive plate.

13. Apparatus according to claim 11 wherein said first locator means comprise a first magnet and pick-up coil combination, and said second locator means comprise a second magnet and pick-up coil combination, said first magnet and pick-up coil combination having one thereof disposed on said first given portion of said first adjustment means and the other one disposed adjacent to said first adjustment means so as to determine a relative position of said first given portion of said adjustment means, and said second magnet and pick-up coil combination having one thereof disposed on said second given portion of said second adjustment means and the other one disposed adjacent to said second given portion of said second adjustment means so as to determine a relative position of said second given portion of said second adjustment means.

14. Apparatus according to claim 11 wherein said first locator means comprise a first magnet and Hall effect sensor combination, and said second locator means comprise a second magnet and Hall effect sensor combination, said first magnet and Hall effect sensor combination having one thereof disposed on said first given portion of said first adjustment means and the other one disposed adjacent to said first given portion of said first adjustment means so as to determine a relative position of said first given portion of said first adjustment means, and said second magnet and Hall effect sensor combination having one thereof disposed on said second given portion of said second adjustment means and the other one disposed adjacent to said second given portion of said second adjustment means so as to determine a relative position of said second given portion of said second adjustment means.

15. Apparatus according to claim 11 wherein said first locator means comprise a first position sensitive diode and light source combination and second locator means comprise a second position sensitive diode and light source combination, said first position sensitive diode and light source combination having one thereof disposed on said first given portion of said first adjustment means and the other one disposed adjacent to said first given portion of said first adjustment means so as to determine a relative position of said first given portion of said first adjustment means, and said second position sensitive diode and light source combination having one thereof disposed on said second given portion of said second adjustment means and the other one disposed adjacent to said second given portion of said second adjustment means so as to determine a relative position of said second given portion of said second adjustment means.

16. Apparatus according to claim 1 further comprising a ferrule disposed at said terminal end of said fiber optic line.

17. Apparatus according to claim 1 wherein said first adjustment means is vertically adjustable and said second adjustment means is horizontally adjustable so as to allow vertical adjustment of said terminal end of said fiber optic line and lateral adjustment of said collimator lens.

18. Apparatus for producing a collimated light beam within an optical switch, said apparatus comprising a module, each said module comprising:
  a supporting structure having a first actuator and a second actuator, said first actuator being selectively adjustable along a first plane, and said second actuator being selectively adjustable along a second plane;
  a fiber optic line having a terminal end to emit a light beam therefrom, said terminal end of said fiber optic line being supported by said first actuator, whereby adjustment of said first actuator repositions said terminal end of said fiber optic line; and
  a collimator lens supported by said second actuator, whereby adjustment of said second actuator repositions said collimator lens;
  wherein at least one of said terminal end of said fiber optic line and said collimator lens is repositioned relative to the other one so as to direct said light beam emitted by said terminal end of said fiber optic line to a given location through said collimator lens, which in turn produces said collimated light beam within said optical switch.

19. Apparatus according to claim 18 wherein said given location of said light beam through said collimator lens produces said collimated light beam with an optimum power transmission within said optical switch.

20. Apparatus according to claim 18 wherein said given location through said collimator lens directs said collimated light beam toward a first position within said optical switch.

21. Apparatus according to claim 20 further comprising repositioning means providing control signals to said first actuator and said second actuator so as to reposition said light beam from said given location to another given location relative to said collimator lens, which in turn repositions said collimated light beam from said first position to a second position within said optical switch.

22. Apparatus according to claim 21 wherein said first position comprises a first reflector and said second position comprises a second reflector.

23. Apparatus according to claim 18 further comprising piezo deflectors mounted to portions of each of said first actuator and said second actuator, respectively, said piezo deflectors being selectively deformable so as to bend said portions of said first actuator in a parallel direction to said first plane and said second actuator in a parallel direction to said second plane, respectively.

24. Apparatus according to claim 18 wherein each of said first actuator and said second actuator comprise sensors mounted thereon, wherein each one of said sensors monitors positional drift of said first actuator and said second actuator for voltage over a period of time.

25. Apparatus according to claim 24 wherein said sensors comprise piezo resistive sensors.

26. Apparatus according to claim 24 wherein said piezo resistive sensors comprise semiconductor strips.

27. Apparatus according to claim 24 wherein said sensors comprise sensor gauges configured to measure bending stresses.

28. Apparatus according to claim 18 further comprising position sensitive devices configured relative to said first actuator and said second actuator so as to determine the locations of said first actuator and said second actuator relative to said position sensitive devices.

29. Apparatus according to claim 28 wherein said position sensitive devices comprise a first capacitive plate and a second capacitive plate, said first capacitive plate being disposed adjacent to said first actuator so as to determine the position of said first actuator relative to said first capacitive plate, and said second capacitive plate being disposed adjacent to said second actuator so as to determine the position of said second actuator relative to said second capacitive plate.

30. Apparatus according to claim 28 wherein said position sensitive devices comprise a first magnet and pick-up coil combination and a second magnet and pick-up coil combination, said first magnet and pick-up coil combination having one thereof disposed on said first actuator and the other one disposed adjacent to said first actuator so as to determine a relative position of said first actuator, and said second magnet and pick-up coil combination having one thereof disposed on said second actuator and the other one disposed adjacent to said second actuator so as to determine a relative position of said second actuator.

31. Apparatus according to claim 28 wherein said position sensitive devices comprise a first magnet and Hall effect sensor combination and a second magnet and Hall effect sensor combination, said first magnet and Hall effect sensor combination having one thereof disposed on said first actuator and the other one disposed adjacent to said first actuator so as to determine a relative position of said first actuator, and said second magnet and Hall effect sensor combination having one thereof disposed on said second actuator and the other one disposed adjacent to said second actuator so as to determine a relative position of said second actuator.

32. Apparatus according to claim 28 wherein said position sensitive devices comprise a first position sensitive diode and light source combination and a second position sensitive diode and light source combination, said first position sensitive diode and light source combination having one thereof disposed on said first actuator and the other one disposed adjacent to said first actuator so as to determine a relative position of said first actuator, and said second position sensitive diode and light source combination having one thereof disposed on said second actuator and the other one disposed adjacent to said second actuator so as to determine a relative position of said second actuator.

33. Apparatus according to claim 18 wherein said supporting structure further comprises an array of units, each of said units formed by one of said fiber optic line supported by said first actuator and one of said collimator lens supported by said second actuator.

34. Apparatus according to claim 33 further comprising a modular component, said modular component comprising one of said units, and said modular component being selectively removable from said supporting structure.

35. Apparatus according to claim 18 further comprising an assembly forming a plurality of ports, each one of said ports being configured to selectively receive an individual one of said supporting structure having a fiber optic line and a collimator lens, wherein each one of said ports permit selective insertion and selective removal of said supporting structure during continuous operation of said switch.

36. Apparatus according to claim 35 wherein said supporting structure further comprises an array of units, each of said units formed by one of said fiber optic line supported by said first actuator and one of said collimator lens supported by said second actuator.

37. Apparatus according to claim 18 further comprising a ferrule disposed at said terminal end of said fiber optic line.

38. Apparatus according to claim 18 wherein said first actuator is vertically adjustable and said second actuator is horizontally adjustable so as to allow vertical adjustment of said terminal end of said fiber optic line and lateral adjustment of said collimator lens.

* * * * *